United States Patent
Kanazawa et al.

[11] Patent Number: 5,982,154
[45] Date of Patent: Nov. 9, 1999

[54] GENERATION-STOP DETECTION SYSTEM OF ALTERNATOR

[75] Inventors: Wakako Kanazawa; Hirohide Sato, both of Toyokawa, Japan

[73] Assignee: Denso Corporation, Kariya, Japan

[21] Appl. No.: 09/016,801

[22] Filed: Jan. 30, 1998

[30] Foreign Application Priority Data

Mar. 14, 1997 [JP] Japan ..................................... 9-060710
Mar. 14, 1997 [JP] Japan ..................................... 9-060711

[51] Int. Cl.$^6$ ....................................................... H02H 7/06
[52] U.S. Cl. ............................................... 322/29; 322/28
[58] Field of Search ........................................ 322/28, 29

[56] References Cited

U.S. PATENT DOCUMENTS

| | | | |
|---|---|---|---|
| 4,362,982 | 12/1982 | Akita et al. ............................... | 320/123 |
| 4,477,766 | 10/1984 | Akita et al. ............................... | 322/28 |
| 4,623,833 | 11/1986 | Edwards ................................... | 322/28 |
| 5,061,889 | 10/1991 | Iwatani et al. ............................ | 322/28 |
| 5,254,935 | 10/1993 | Vercesi et al. ........................... | 322/29 |
| 5,306,977 | 4/1994 | Hayashi ................................... | 310/263 |
| 5,483,116 | 1/1996 | Kusase et al. ........................... | 310/263 |
| 5,483,146 | 1/1996 | Schultz et al. ........................... | 322/29 |
| 5,497,071 | 3/1996 | Iwatani et al. ............................ | 322/29 |

*Primary Examiner*—Nestor Ramirez
*Assistant Examiner*—Peter Medley
*Attorney, Agent, or Firm*—Pillsbury Madison & Sutro Intellectual Property GRP

[57] ABSTRACT

A generation-stop detection system of an alternator is provided. A unit provides a generation-stop condition signal when an output voltage of the alternator is lower than a reference voltage. A rotation speed detection unit detects a rotation speed. A reference voltage changing unit changes the reference voltage proportionally to the rotation speed of the alternator. A warning signal unit provides a warning signal if the generation-stop condition signal is provided at a rotation speed lower than a predetermined speed. The warning signal is maintained even when the rotation speed of the alternator becomes higher than the predetermined speed. The warning signal is interrupted when the output voltage of the alternator is higher than the voltage of the battery.

71 Claims, 5 Drawing Sheets

GENERATION-STOP DETECTION SYSTEM OF ALTERNATOR

CROSS REFERENCE TO RELATED APPLICATION

The present application is based on and claims priority from Japanese Patent Applications Hei 9-60710 filed on Mar. 14, 1997 and Hei 9-60711 filed on Mar. 14, 1997, the contents of which are incorporated herein by reference.

BACKGROUND OF THE INVENTION

1. Field of the Invention

The present invention relates to a system for detecting generation-stop condition of an alternator.

2. Description of the Related Art

Generally, a voltage regulation system of a vehicle alternator has various warning functions. For example, if the alternator stops generating for some reason while the alternator is rotated by an engine, a battery charge lamp is turned on to warn the driver of the abnormal generation stop condition.

A conventional device for monitoring for generation-stops is shown in JP-A-57-142144 entitled "GENERATION CONTROL DEVICE FOR VEHICLE". In the generation control device, an output voltage is obtained by rectifying and smoothing a phase voltage generated in the stator coil, and it is compared with a reference voltage. If the output voltage is lower than the reference voltage, the charge lamp is turned on. If a generation stop occurs due to a break down of the field coil or the like, the charge lamp is turned on so that the driver can be aware of the generation stop condition.

However, if the rotor of the alternator is provided with permanent magnets disposed between the claw poles as shown in JP-A-5-207716 and JP-A-7-123664, magnetic flux is supplied from the permanent magnets even when the field current is not supplied to the field coil. Accordingly, when the rotation speed of the alternator increases, the output voltage becomes higher than the reference voltage, and the generation stop condition cannot be detected. If the reference voltage is raised higher than the voltage generated without the field current supplied to the field coil to prevent the above problem, it would take a long time for the charge lamp to turn off after the engine starts and the alternator generates output voltage higher than the reference voltage. This may mislead the driver to think that the alternator has stopped generating.

SUMMARY OF THE INVENTION

The present invention is made in view of the above problems. An object of the present invention is to provide an improved generation-stop detecting system.

According to the present invention, if it is detected that the alternator stops generation when the rotation speed is lower than a predetermined speed, a warning signal is provided and maintained thereafter even if the alternator rotates at a speed higher than the predetermined speed.

According to a main feature of the present invention, a reference voltage is provided to detect the generation stop condition and is changed according to the rotation speed as long as the rotation speed is lower than a maximum constant amount.

Preferably, the reference voltage is set to be proportional to the output voltage generated by the remnant magnetism or the permanent magnets. In particular, because the reference voltage is set to a low voltage when the rotation speed is low, it does not take a long time for the charge lamp to turn off after the key is turned and the engine rotates as long as the alternator operates normally.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A generation-stop detection system according to a preferred embodiment is described with reference to FIG. 1-FIGS. 3A–3G and FIG. 6.

The generation-stop detection system of an alternator 1 is composed of a generation control unit 2, a warning unit 4 and a charge lamp 84.

Figure 6:
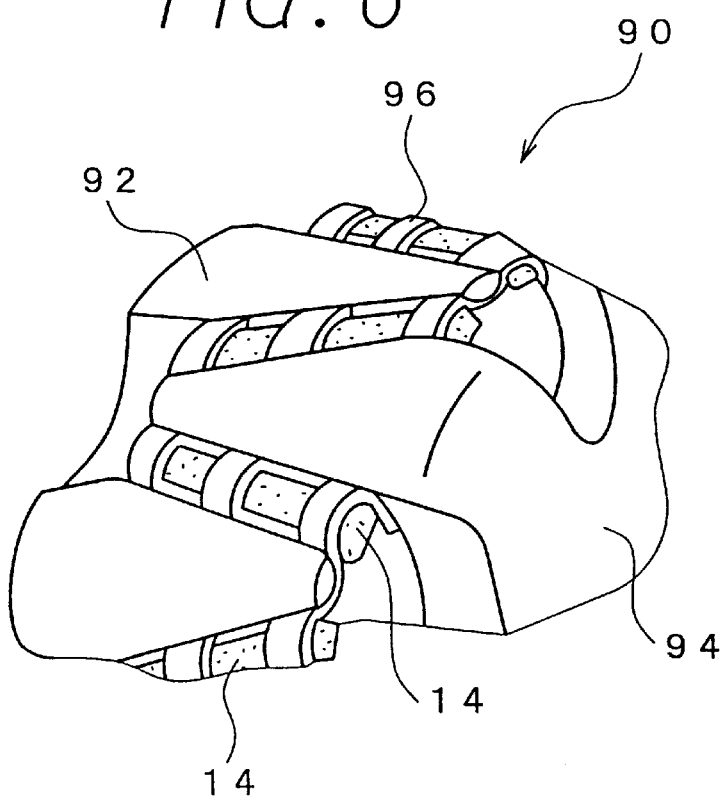
FIG. 6 is a fragmented perspective view illustrating a rotor of an alternator having permanent magnets therein.

The alternator 1 is driven by an engine (not shown) and generates output power to be supplied to a battery 80 and an electric load 82. The output voltage is regulated by the generation control unit 2. The alternator 1 is composed of a three-phase stator coil 10, a Lundell type rotor 90 having a field coil 12 and a three-phase full-wave rectifying circuit 16 for rectifying the three-phase alternating current supplied from the output terminals of the stator coil 10. The rotor 90 has a plurality of claw poles 92 and 94 enclosing the field coil 12, and a plurality of permanent magnets 14 disposed between adjacent two of the claw poles 92 and 94 as shown in FIG. 6.

The generation control unit 2 is composed of a switching transistor 20, a flywheel diode 22 connected in parallel with the field coil 12, a comparator 30, an OR circuit 32 connected between the comparator 30 and the switching transistor 20, a voltage dividing circuit composed of series connected resistors 24 and 26 and a reference voltage generating unit 28 connected to the plus input-terminal of the comparator 30. The terminal voltage of the battery 80 (or the output voltage of the alternator 1) is divided by the voltage dividing circuit (composed of the resistor 24 and 26) and applied to the minus input-terminal of the comparator 30. If the divided voltage is higher than a reference voltage provided by the reference voltage generating unit 28, the comparator 30 provides a low level signal. If the divided voltage is lower than the reference voltage, the comparator 30 provides a high level signal. If the comparator 30 provides a high level signal, the switching transistor 20 is turned on to supply the field current, so that the alternator 1 generates the output power and increases the output voltage. On the other hand, if the comparator 30 provides a low level signal, the switching transistor 20 is turned off to cut the supply of the field current, so that the output voltage of the alternator lowers. Thus, the output voltage of the alternator 1 is regulated to be constant.

The warning unit 4 is composed of a voltage dividing circuit having series connected resistors 40 and 42, a rotation speed detection/reference-voltage changing unit (hereinafter referred to as SDRC unit) 50, a diode 46, a parallel circuit of resistor 44 and a capacitor 48, a comparator 52, a holding circuit composed of an inverter circuit 54, a delay circuit composed of the resistor 56 and the capacitor 58, AND circuits 60 and 62 and an S-R flip-flop circuit (hereinafter referred to as the SR-FF) 64, a transistor 66, a voltage dividing circuit having series connected resistors 68 and 70, and a comparator 72.

The SDRC unit 50 detects the rotation speed of the alternator 1 and sets and changes a reference voltage for deciding whether the alternator 1 generates power normally or not. The comparator 52 compares the reference voltage set by the SDRC unit 50 with a voltage divided from the output voltage of the alternator 1. The SR-FF 64 holds the comparison result of the comparator 52, and the transistor 66 turns on or off -the charge lamp 84 in response to the output signal of the SR-FF 64. The warning unit 4 warns a driver if the alternator stops generation while the alternator 1 is rotated by the engine (hereinafter referred to as the generation stop condition) by turning on the charge lamp 84.

One phase voltage of the stator coil 10 is applied to a terminal P to be divided by the voltage dividing circuit composed of the resistors 40 and 42 and is applied to the anode of the diode 46. The cathode of the diode 46 is connected to one end of the parallel circuit of resistor 44 and the capacitor 48, whose other end is grounded. If the potential of the anode of the diode 46 (the divided voltage) is higher than the potential of the junction of the capacitor 48 by the voltage drop of the diode 46, current flows from the diode 46 to the capacitor 48 to charge the capacitor 48 until the potential of the capacitor becomes a voltage that is the forward voltage drop of the diode 46 and that is lower than the peak of the voltage (divided from the phase voltage of the alternator 1) applied to the anode of the diode 46. If the potential of the anode of the diode 46 is lower than the potential of the capacitor 48, current does not flow through the diode 46, and the potential of the capacitor 48 remains proportional to the peak of the phase voltage.

Figure 1:
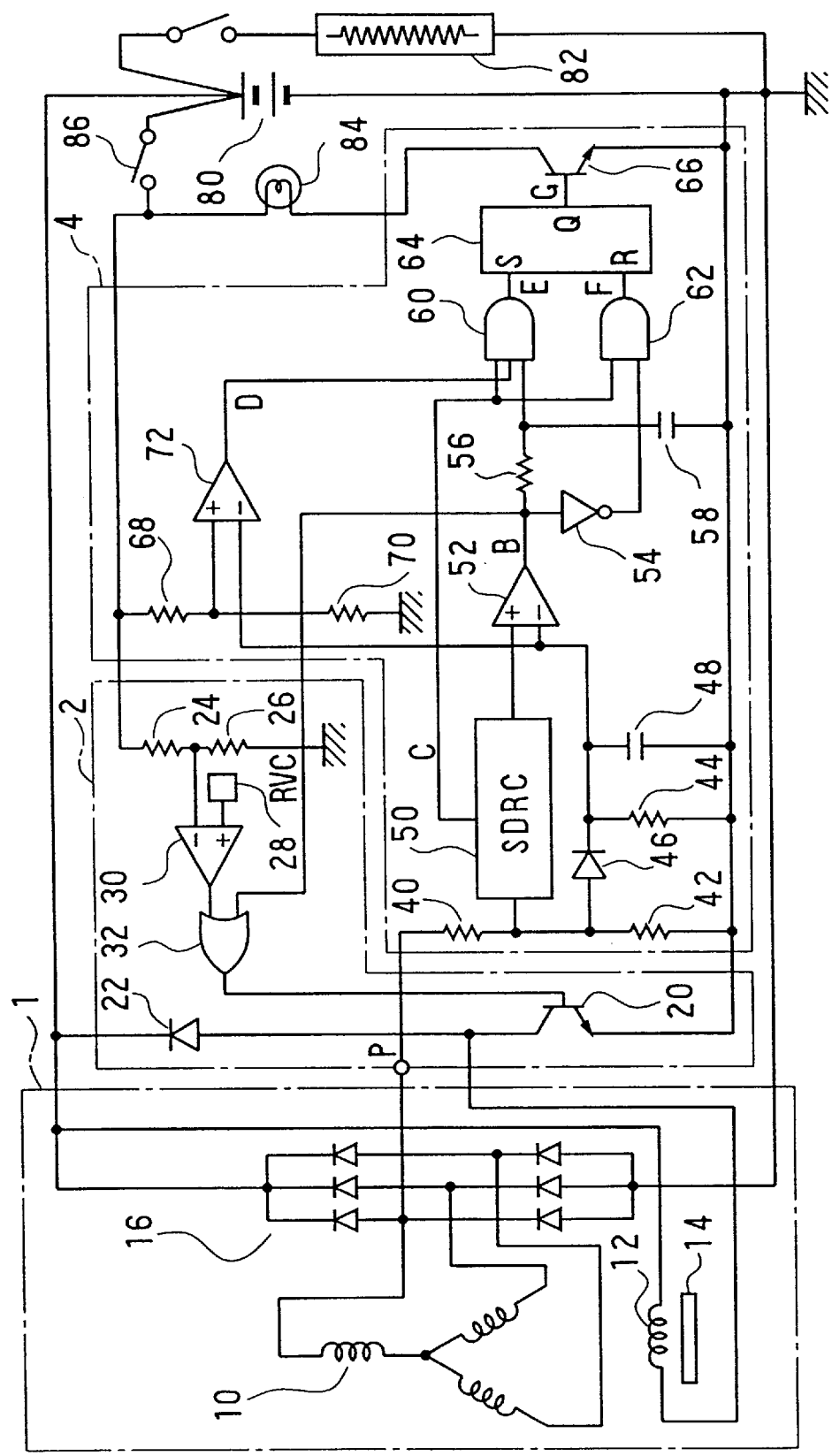
FIG. 1 is a circuit diagram showing the general structure of a generation-stop detecting system according to a preferred embodiment of the present invention.
Figure 2:
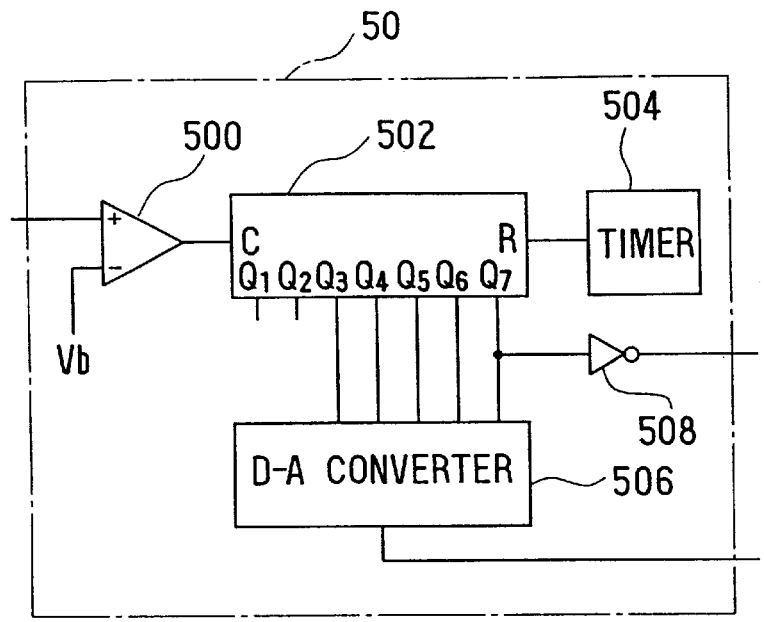
FIG. 2 is a circuit diagram of a rotation speed detection/reference-voltage changing (SDRC) unit used in the generation-stop detection system shown in FIG. 1.

The SDRC unit 50 is composed of a comparator 500, a counter 502, a timer 504, a digital-analog converter (D-A converter) 506 and an inverter 508, as shown in FIG. 2. The phase voltage of the stator coil 10 is applied to the plus-input terminal of the comparator 500 through the resistors 40 and 42. The input voltage is compared with a predetermined voltage Vb applied to the minus input-terminal thereof to provide a pulse signal synchronized with the rotation speed of the alternator 1. The voltage Vb applied to the minus input terminal is nearly zero volts, and the comparator 500 provides the pulse signal which is in synchronism with the rotation cycle of the alternator 1.

The counter 502 counts the number of pulses provided by the comparator 500 in a unit time (e.g. 100 msec.) which is set by the timer 504. The counter 502 holds the number last counted while it is counting the number of pulses to renew the number last counted after the unit time. The counter 502 provides upper (n-m) bits out of n-bits-counted-number (i.e. an upper 5-bit-number is provided instead of an entire 7-bit-number). Accordingly, the counter provides "0" initially until the rotation speed of the alternator 1 exceeds a lower limit speed corresponding to the lower two-bit number. The counted number thereafter increases in proportion to the rotation speed. If the rotation speed of the alternator 1 increases to a higher limit speed so that each bit of the counted number becomes "1", such number is maintained thereafter.

The D-A converter 506 provides an analog signal corresponding to the counted number (digital data) of the counter 502. The D-A converter 506 provides an offset voltage when the rotation speed is lower than the lower limit speed and the counted number of the counter 502 is "0". On the other hand, the D-A converter provides a voltage which is proportional to the counted number of the counter 502 when the rotation speed of the alternator 1 exceeds the lower limit speed and the counted number thereof increases. When the rotation speed of the alternator further reaches the upper limit speed and the counted number of the counter is held constant with an upper limit number, the D-A converter 506 provides a constant voltage which corresponds to the upper limit number. Thus, the output voltage of the D-A converter is used as the reference voltage for deciding whether the alternator 1 is in the generation stop condition or not.

The inverter 508 is connected to the output terminal for the uppermost bit of the counter 502. If the rotation speed of the alternator 1 is lower than a certain speed Na and the signal provided by the terminal for the uppermost bit is "0", the inverter 508 provides "1" or the high level signal. On the other hand, if the rotation speed of the alternator 1 is higher than the speed Na and the signal provided by the terminal for the uppermost bit becomes "1", so that the inverter 508 provides "0"or the low level signal.

The comparator 52 compares the potential of the capacitor 48, which corresponds to the output voltage of the alternator, with the reference voltage provided by the D-A converter 506 of the SDRC unit 50. If the potential of the capacitor 48 is higher than the reference voltage, the comparator 52 provides a low level signal. The low level signal represents the normal operation of the alternator. The output signal of the comparator 52 is applied to the R-terminal of the SR-FF 64 through the inverter circuit 54 and the AND circuit 62 and to the S-terminal of the SR-FF 64 through the delay circuit composed of the resistor 56 and the capacitor 58 and the AND circuit 60. If all the signals applied to other input terminals of the AND circuit 60 and 62 are high level signals and the comparator 52 provides the low level signal, the inverter 54 provides the high level signal, thereby causing the SR-FF 64 to provide the high level signal at the R-terminal thereof through the AND circuit 62. Thus, the transistor 66 remains turned off so that the charge lamp 84 remains turned off.

The comparator 72 compares the potential of the capacitor 48 with a voltage divided from the battery voltage by the voltage dividing circuit composed of the resistors 68 and 70. The dividing ratio provided by the resistors 40 and 42 and the dividing ratio provided by the resistors 68 and 70 are arranged so that the comparator 72 can provide the low level signal when the output signal of the alternator 1 becomes higher than the battery voltage. If the potential of the capacitor 48 is higher than the voltage divided by the resistors 68 and 70, in other words, if the output voltage of the alternator is higher than the battery voltage, the comparator 72 provides a low level signal, which is applied to an input terminal of the AND circuit 60.

When the alternator operates normally and the comparator 72 provides the low level signal, it is not necessary to detect the generation stop condition. Accordingly, the high level signal is not applied to the S-terminal of the SR-FF 64 even if the comparator 52 provides the high level signal.

Thus, the output signal for maintaining the last condition (hereinafter referred to as the maintenance signal) is provided by the inverter 508 of the SDRC unit 50 and applied to each of the AND circuits 60 and 62. When the rotation speed of the alternator 1 becomes higher than the speed Na, the terminal of the uppermost bit of the counter 502 provides the high level signal so that the output signal of the inverter 508 of the SDRC unit 50 changes from the high level signal to the low level signal that is the maintenance signal. Consequently, the low level signals are provided by the AND circuits 60 and 62 and are applied to the S-terminal and the R-terminal of the SR-FF 64, thereby maintaining or locking the output signal thereof.

FIGS. 3A–3G are graphs showing relationship between the rotation speed of the alternator 1 and the voltage level of input and output signals of various portions of the warning unit 4. In each of FIGS. 3A–3G, a dotted line corresponds to the normal operation of the alternator 1 and a solid line corresponds to the generation stop condition, such as when the field coil 12 breaks down and the alternator 1 stops generation. Each of FIGS. 3B–G shows the relationship between the voltage level (vertical axis) of one of portions shown in FIG. 1 denoted by corresponding one of reference characters B-G and the rotation speed of the alternator 1 (horizontal axis).

Figure 3A:
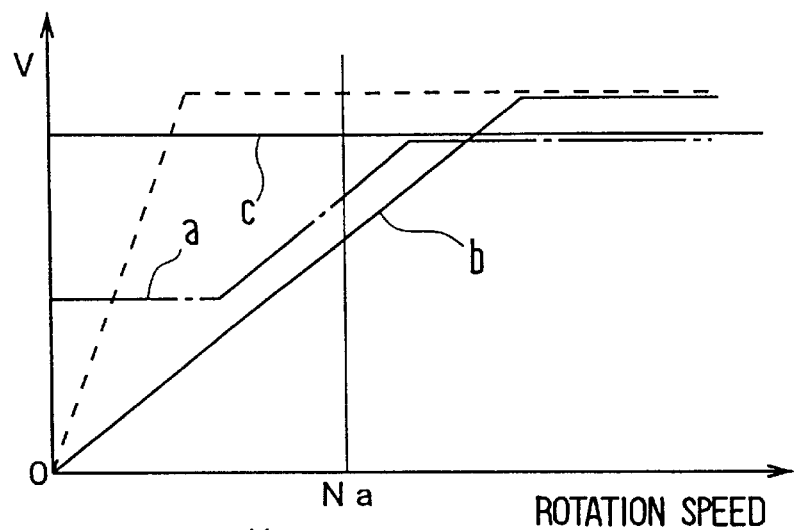
FIGS. 3A–3G are graphs respectively showing the relationship between the rotation speed of the alternator and signals applied to or from various portions of a warning unit used in the generation-stop detection system shown in FIG. 1.

In FIG. 3A, a one-dot-chain line a shows the characteristic curve of the reference voltage provided by the D-A converter 506 of the SDRC unit 50. If the rotor of the alternator 1 has permanent magnets 14 therein, the output voltage of the alternator 1 increases as the rotation speed thereof becomes higher as shown by a solid line b in FIG. 3A even if the field current is not supplied to the field coil. When the output voltage exceeds a voltage that is the sum of the battery voltage and the forward voltage drop of the diode of the full-wave rectifying circuit 16, current is supplied to the battery 80 and the electric load 82 through the full-wave rectifying circuit 16. Because the magnetic field caused by the permanent magnets 14 is comparatively smaller than the magnetic field of the field coil supplied with field current, the phase voltage applied to the terminal P is maintained constant by the battery 80 even if the alternator 1 rotates at higher speed.

As shown by the curve a in FIG. 3A, the reference voltage in the middle speed range is set proportional to and a little higher than the maximum voltage (with some variation between individual alternators) that is generated without supplying the field coil, the reference voltage in the low speed range is set to a constant voltage continuous with the reference voltage in the middle speed range, and the reference voltage in the high speed range is the constant voltage which is a little lower than the battery voltage and is continuous with the reference voltage in the middle speed range.

The D-A converter 506 provides the offset voltage which corresponds to the reference voltage in the low speed range. As the rotation speed of the alternator 1 becomes higher, the counted number of the counter 502 increases, so that the output voltage of the D-A converter 506 increases in proportion to the rotation speed. This output voltage corresponds to the reference voltage in the middle speed range. More precisely, the reference voltage corresponding to the counted number of the counter 502 changes stepwise because the counted number of the counter 502 changes stepwise. When the rotation speed of the alternator 1 increases and the counted number of the counter reaches the upper limit number (all bits of the output terminals become "1"), the upper limit number is maintained. Accordingly, the output voltage of the D-A converter 506 becomes constant, and this corresponds to the reference voltage in the high speed range.

When the ignition key is turned, the alternator 1 does not generate power immediately. Consequently, the phase voltage of the stator coil 10 applied to the terminal P is 0 volts, and the comparator 52 of the warning unit 4 provides the high level signal. Accordingly, the terminal Q of the SR-FF 64 provides the high level signal to turn on the transistor 66, thereby turning on the charge lamp 84.

When the ignition key is further turned and the starter (not shown) is started, the rotation speed of the alternator increases as the engine rotates faster. Consequently, the comparator 30 of the generation control unit 4 provides the high level signal so that the switching transistor 20 is turned on to supply the field current to the field coil 12 of the alternator 1 and, therefore, the output voltage of the alternator 1 increases in proportion to the rotation speed thereof.

Figure 3B:
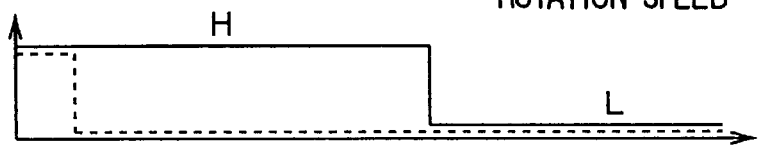
Figure 3C:
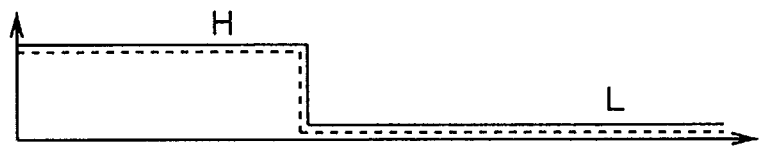
Figure 3D:
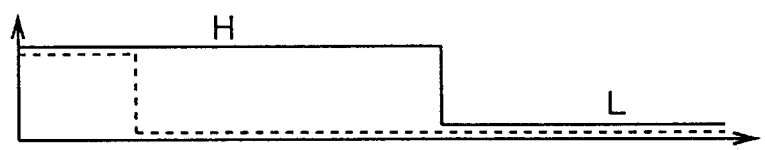
Figure 3E:
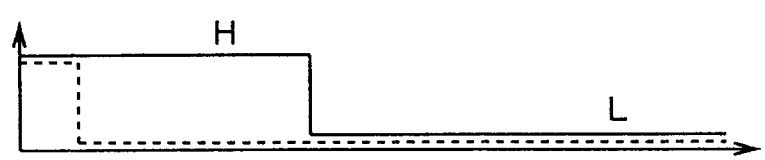
Figure 3F:
Figure 3G:
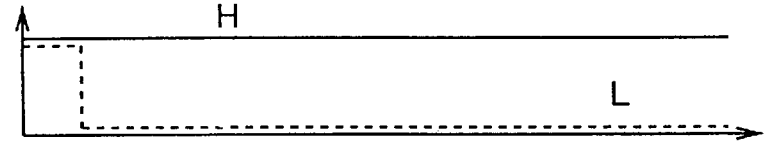

When the output voltage of the alternator 1 becomes higher than the reference voltage for the low speed range, the comparator 52 provides the low level signal as shown in FIG. 3B. The low level signal is applied to the S-terminal of the SR-FF 64, as shown in FIG. 3E, through the AND circuit 60 and is inverted and applied to the R-terminal of the SR-FF 64, as shown in FIG. 3F, through the AND circuit 62. Thus, the SR-FF 64 is reset so that the low level signal is applied to the base of the transistor 66 from the Q-terminal, as shown in FIG. 3G, to turn off the transistor 66 and the charge lamp 84.

When the output voltage of the alternator 1 becomes higher than the battery voltage, the S-terminal of the SR-FF 64 is shut against the high level signal, thereby preventing the charge lamp 84 from turning on. Thus, the comparator 72 of the warning unit 4 provides the low level signal as shown in FIG. 3D, and the output signal of the AND circuit 60 is locked in the low level signal even if the high level signal is applied to the S-terminal thereafter. Thus, the charge lamp 84 remains turned off.

If the large electric load 82 is disconnected from the battery 80 instantly, the output voltage of the alternator 1 becomes very high even while the alternator 1 is operating normally, and the battery becomes overcharged. Consequently, the field current is cut to stop the generation of the alternator. If the output voltage of the alternator 1 becomes lower than the reference voltage for a corresponding one of the speed ranges, the comparator 52 provides the high level signal. However, the AND circuit 60 maintains the low level signal for a certain period. Because the output terminal of the comparator 52 is connected to one of the input terminals of the OR circuit 32 of the generation control unit 2, the high level voltage of the comparator 52 is applied to the base of the switching transistor 20 through the OR circuit 32 to supply the field current to the field coil 12. Therefore, the output voltage of the alternator 1 does not become much lower than the reference voltage. Although the output voltage becomes lower than the reference voltage temporarily, it recovers immediately while the high level output signal of the comparator 52 is delayed and smoothed by the delay circuit. Therefore, the high level signal is not applied to the S-terminal of the SR-FF 64 before the low level signal of the comparator 52 is inverted and applied to the R-terminal of the SR-FF 64. Thus, the transistor 66 is maintained turned off.

If the field coil 12 breaks down when the alternator 1 generates a normal output voltage, the warning unit 4 operates as follows. When the rotation speed of the alternator 1 becomes higher than the speed Na, the inverter 508 of the SDRC unit 50 provides the low level maintenance signal. However, this signal is provided only when the rotation speed is in the middle speed range shown in FIG. 3A.

If the generation of the alternator 1 stops while the alternator rotates at a speed lower than the speed Na, the output voltage of the alternator 1 becomes lower than the reference voltage. Consequently, the comparator 52 provides the high level signal, which is applied to the S-terminal of the RS-FF 64 through the AND circuit 60. As a result, the transistor 66 is turned on to energize the charge lamp 84.

When the rotation speed of the alternator 1 is higher than the speed Na, the SDRC unit 50 provides the AND circuits 60 and 62 with the maintenance signal so that output signal of the SR-FF 64 can not be renewed. Thus, if the generation stop condition is detected when the rotation speed of the alternator is lower than the speed Na, the charge lamp 84 is maintained turned on, thereafter. If the generation of the alternator 1 stops while the alternator rotates at a speed higher than the speed Na, the output signal of the SR-FF 64 is fixed and the charge lamp 84 is not turned on. However, the generation stop condition is detected once the rotation speed of the alternator 1 becomes low, and the charge lamp 84 is maintained turned on thereafter even if the rotation speed of the alternator 1 becomes high.

Because the reference voltage is set low when the rotation speed of the alternator is low, the charge lamp 84 can be turned off in a short time as long as the alternator 1 is normal.

Figure 4:
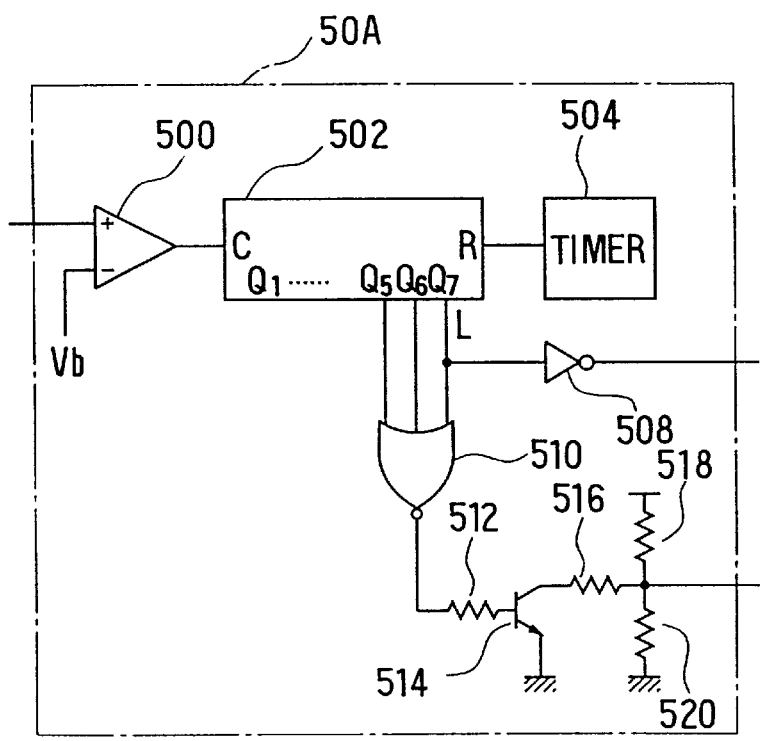
FIG. 4 is a circuit diagram of a variation of the rotation speed detection/reference-voltage changing (SDRC) unit shown in FIG. 2.

FIG. 4 shows a variation of the SDRC unit 50. A SDRC unit 50A is composed of the comparator 500, the counter 502, the timer 504, the inverter circuit 508, a NOR circuit 510, a transistor 514 and resistors 512, 516, 518 and 520. The comparator 500, the counter 502, the timer 504 and the inverter 508 are the same in function as those of the SDRC unit 50 shown in FIG. 2. The NOR circuit 510 has three input terminals connected to the output terminals Q5, Q6 and Q7 of upper three bits of seven bits of the counter 502. Accordingly, the NOR circuit 510 provides the high level signal as long as the rotation speed of the alternator 1 is lower than a certain speed, and the low level signal otherwise. The transistor 514 is turned on or off according to the output signal of the NOR circuit 510. If the rotation speed of the alternator 1 is low and the NOR circuit 510 provides the high level signal, the transistor 514 is turned on. Consequently, one end of the resistor 516 connected to the collector thereof is grounded through the collector-emitter path thereof, thereby forming a dividing circuit composed of the resistors 516, 518 and 520. If the rotation speed of the alternator 1 is high and the NOR circuit provides the low level signal, the transistor 514 is turned off. Consequently, the resistor 516 floats, and the voltage dividing circuit is composed of the resistors 518 and 520. Because the voltage dividing ratio of the voltage dividing circuit composed of the three resistors 516, 518 and 520 is smaller than that of the voltage dividing circuit composed of the two resistors 518 and 520, a lower constant reference voltage is provided in the low speed range, and a higher constant reference voltage is provided in the high speed range.

Figure 5:
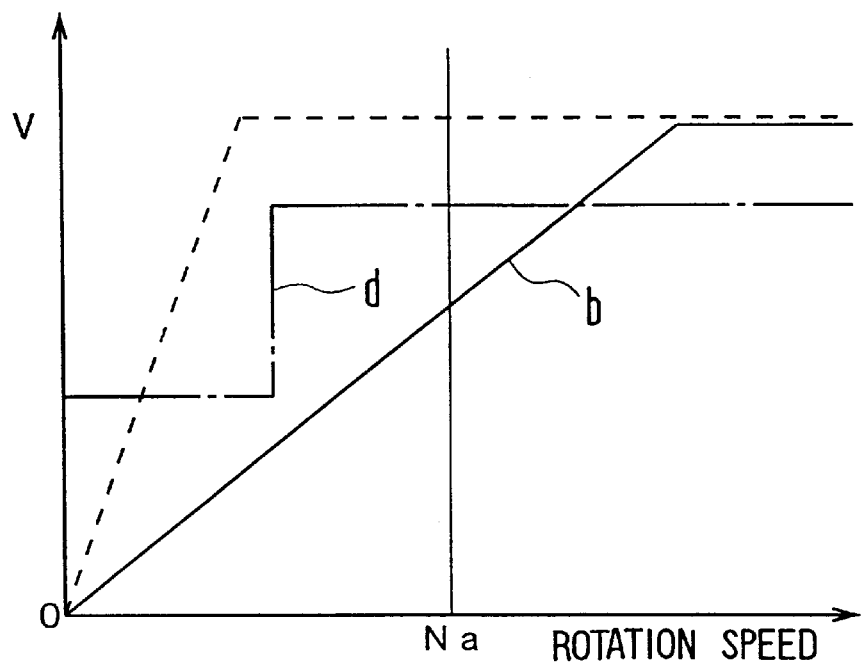
FIG. 5 is a graph showing the relationship between the rotation speed of the alternator and the reference voltage provided by the rotation speed detection reference-voltage changing (SDRC) unit shown in FIG. 4.

Thus, the reference voltage provided by the SDRC unit 50A is set low when the rotation speed of the alternator is low so that the time period for turning-off of the charge lamp 84 can be reduced. The above reference voltage is set to increase stepwise as the rotation speed of the alternator 1 increases, as shown by a one-dot chain line d in FIG. 5, so that the generation stop condition can be detected surely even if the output voltage without field current becomes higher. If the rotation speed of the alternator 1 increases after the generation stop condition is detected, the SDRC unit 50A provides the maintenance signal to maintain the output signal of the SR-FF 64 so that the charge lamp 84 is maintained turned on even if the output voltage of the alternator becomes high temporarily.

It is noted that the SDRC unit 50 can detect the generation stop condition more accurately than the SDRC unit 50A, however the latter is simpler in structure than the former.

The rotation speed Na is set lower than the rotation speed where the output voltage of the alternator 1, generated when the field current is not supplied to the field coil, becomes the same as the reference voltage, in other words, the rotation speed where a one-dot chain line d and the solid line b (the same as shown in FIG. 3A) cross each other.

FIG. 6 illustrates permanent magnets 14 disposed in the rotor. Each of the magnetized permanent magnets 14 is inserted between the claw poles 92 and 94 of the rotor 90 in the direction that the leakage magnetic flux between the claw poles 92 and 94 is suppressed. The permanent magnets 14 are held in the magnet holders 96 made of non-magnetic metal. Each of the magnet holders 96 can be formed into a box-shape covering the whole outer surfaces of the permanent magnets 14 or molded with resinous material.

In the warning unit 4, it is possible to apply the maintenance signal only to the AND circuit 62 connected to the R-terminal of the RS-FF 64 if the charge lamp 84 does not turn off erroneously. In this case, if the charge lamp 84 is turned on in the low speed range, it is not turned of f in the high speed range. The charge lamp 84 can be turned on after the maintenance signal is provided. As far as the output voltage of the alternator 1 is not higher than the battery voltage (while the comparator 72 provides the high level signal), if the output voltage of the alternator 1 becomes lower than the reference voltage provided by the SDRC unit 50 or 50A, the high level signal is applied to the S-terminal of the SR-FF 64 to change the output signal of the SR-FF 64 from the low level to the high level, thereby turning on the charge lamp 84. Thus, the S-terminal of the SR-FF 64 indicates the generation stop condition of the alternator 1 even after the maintenance signal is provided. The present invention can be applied to a rotor without the permanent magnets 14 in the same manner.

Figure 7:
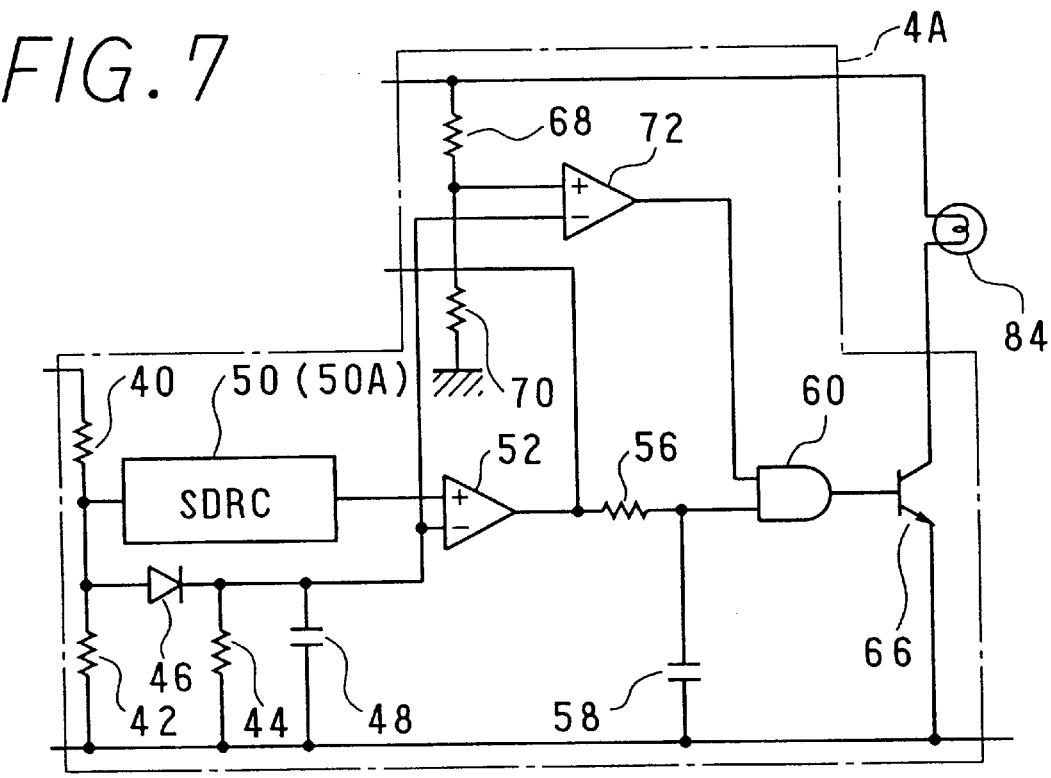
FIG. 7 is a circuit diagram of a variation of the warning unit shown in FIG. 1.

FIG. 7 shows a circuit diagram of a warning unit 4A which detects the generation stop condition only through the operation of changing the reference voltage by the SDRC unit 50 or 50A. The warning unit 4A is different from the warning unit 4 in that the SR-FF 64, the AND circuit 62 and the inverter 54 are omitted. Other portions are the same. The omission of the SR-FF 64 can save the maintenance signal provided by the SDRC unit 50 or 50A. Thus, as far as the alternator operates normally, the output voltage thereof is compared with the reference voltage which is proportional to the rotation speed of the alternator to detect the generation stop condition so that the charge lamp 84 can be turned off in the low speed range immediately.

Figure 8:
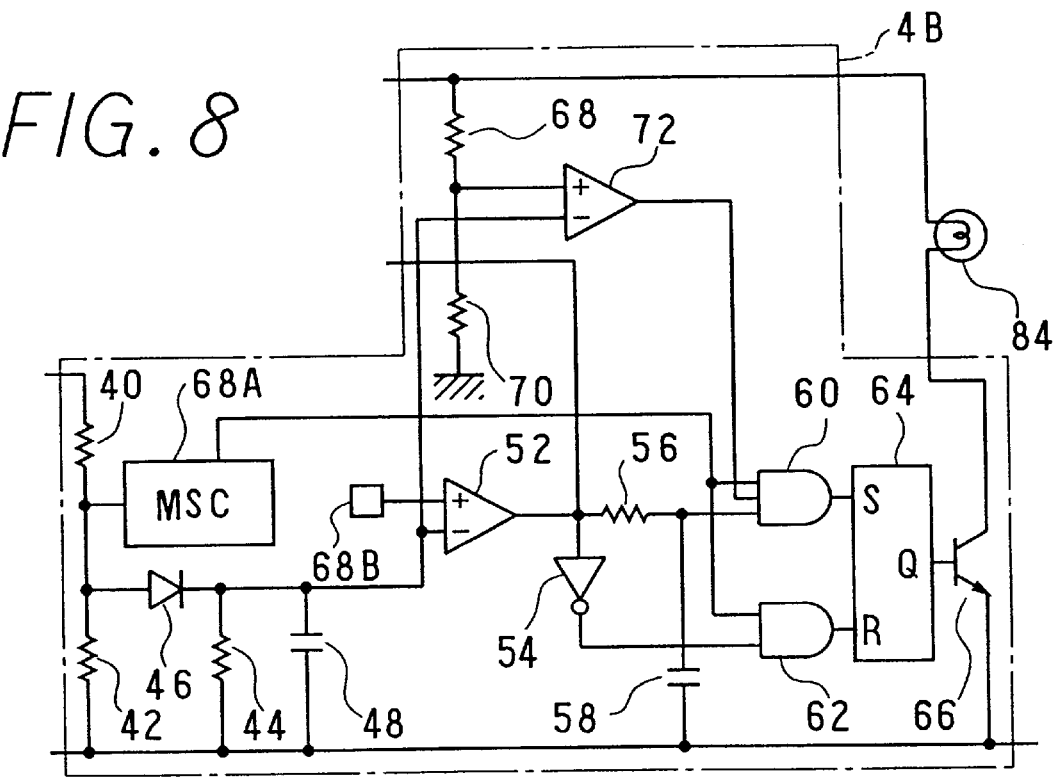
FIG. 8 is a circuit diagram of another variation of the warning unit shown in FIG. 1.

FIG. 8 shows a circuit diagram of a warning unit 4B for solely maintaining the generation stop condition which is detected in the low speed range, and for providing the reference voltage which is constant over the entire speed range. The warning unit 4B is different from the warning unit 4 in that the SDRC unit 50 is replaced with a circuit 68A for providing the maintenance signal and a reference voltage generating circuit 68B. Other portions are the same as those shown in FIG. 1. The reference voltage generating circuit 68B provides a constant reference voltage in the low speed range as shown by the one-dot chain line a in FIG. 3A. The circuit 68A provides the maintenance signal at a speed lower than the speed where the output voltage of the alternator generated without the field current becomes higher than the constant reference voltage. If the rotation speed becomes higher than this speed, the output signal of the SR-FF 64 is not renewed. Thus, the generation stop condition detected in the low speed range is maintained after the rotation speed increases, so that the charge lamp 84 can be maintained turned on.

In the above embodiment, the generation stop signal can be transmitted to another device such as an engine control unit (ECU) or the like instead of or together with the charge lamp 84 when the generator stop condition is detected.

The SDRC unit 50A shown in FIG. 4 can provide a three-step reference voltage instead of a two-step reference voltage.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A system for detecting when an alternator stops generating, said alternator having a rotor and a field coil, said system comprising:

a reference level setting unit for providing a reference voltage level, said reference voltage level being lower than a normal output voltage of said alternator and higher than the output voltage of said alternator generated when said field coil is not excited;

a condition detection unit providing a generation-stop condition signal when the output voltage of said alternator becomes lower than said reference level;

a speed detection unit detecting a rotation speed of said alternator; and a correction unit for correcting said generation-stop condition signal according to said rotation speed of said alternator.

2. The system according to claim 1, wherein said rotor comprises said field coil and a permanent magnet disposed in a magnetic field generated by said field coil.

3. The system according to claim 1, wherein said condition detection unit provides said generation stop condition signal according to a result of a comparison between said output voltage of said alternator and a voltage of said reference level.

4. The system according to claim 1, wherein said correction unit comprises a reference-voltage changing unit for changing the voltage of said reference level as the rotation speed of said alternator changes.

5. The system according to claim 4, wherein said reference voltage changing unit increases said voltage of said reference level as said rotation speed of said alternator becomes higher.

6. The system according to claim 5, wherein the voltage of said reference level is proportional to and higher than the output voltage of said alternator generated when a field current is not supplied to said field coil.

7. The system according to claim 5, wherein the voltage of said reference level is set lower than a battery voltage.

8. The system according to claim 5, further comprising a unit for nullifying said generation-stop condition signal when the output voltage of said alternator becomes higher than a battery voltage.

9. The system according to claim 1, wherein said correction unit comprises a maintenance unit for providing a maintenance signal to maintain said generation-stop condition signal after the rotation speed of said alternator becomes higher than a predetermined speed.

10. The system according to claim 9, wherein said maintenance unit provides a warning signal if said condition detection unit provides said generation-stop condition signal when the rotation of said alternator is lower than said predetermined speed.

11. The system according to claim 9, wherein said condition detection unit provides said generation stop condition signal according to a result of a comparison between said output voltage of said alternator and the voltage of said reference level.

12. The system according to claim 9, wherein said correction unit comprises a reference voltage changing unit for changing the voltage of said reference level as the rotation speed of said alternator changes.

13. The system according to claim 12, wherein said reference voltage changing unit increases the voltage of said reference signal as the rotation speed of said alternator becomes higher.

14. The system according to claim 13, wherein the voltage of said reference level is proportional to and higher than the output voltage of said alternator generated when a field current is not supplied to said field coil.

15. A system for detecting when an alternator stops generating, said alternator charging a vehicle battery by supplying field current to a field coil, said system comprising:

first means for providing a generation-stop condition signal when an output voltage of said alternator is lower than a reference voltage;

second means for detecting a rotation speed of said alternator;

third means for changing said reference voltage proportionally to the rotation speed of said alternator;

fourth means for providing a warning signal if said generation-stop condition signal is provided at a rotation speed lower than a predetermined speed; and fifth means for maintaining said warning signal even when the rotation speed of said alternator becomes higher than said predetermined speed.

16. The system according to claim 15, further comprising sixth means for deactivating said fourth means when the output voltage of said alternator is higher than the voltage of said battery.

17. The system according to claim 16, wherein said fourth means comprises a delay circuit for interrupting the generation-stop condition signal for a predetermined period, preventing an erroneous warning due to an abrupt change in a vehicle load connection.

18. A system for detecting when an alternator stops generating, said alternator charging a vehicle battery by supplying a field current to a field coil, said system comprising:

first means for detecting a rotation speed of said alternator;

a reference signal generating circuit connected to said alternator and said first means, said reference signal generating circuit generating a reference signal having a voltage increasing as the rotational speed of said alternator increases, said reference signal generating circuit comprising a counter providing numbers corresponding to said rotation speed;

a generation-stop signal circuit providing a generation-stop signal when an output voltage of said alternator is lower than said reference voltage; and second means for providing a warning signal if said generation-stop condition is provided at a rotation speed lower than a predetermined speed.

19. The system according to claim 18, further comprising a warning signal maintenance circuit connected between said reference signal generating circuit and said second means, said maintenance circuit maintaining said warning signal when the rotation speed of said alternator becomes higher than said predetermined speed.

20. The system according to claim 19, wherein said warning signal maintenance circuit comprises an RS flip-flop circuit connected to said second means.

21. The system according to claim 20, further comprising a battery connected to said alternator and third means for comparing the output voltage of said alternator with a voltage of said battery, and further comprising a gate circuit connected between said generation-stop signal circuit and said flip-flop circuit, said gate circuit interrupting said warning signal when the output voltage of said alternator is higher than said battery voltage.

22. A system for detecting when an alternator stops generating, said alternator comprising a rotor and a field coil, said system comprising:

a generation condition detection unit providing a generation-stop condition signal when signals respectively indicating a generation voltage of said generator and a reference level are compared and said generation voltage is found to be lower than said reference level;

a speed detection unit detecting a rotation speed of said alternator; and a correction unit for correcting said signals according to said rotation speed to prevent an undesired stoppage of said generation-stop condition signal due to an increase in said generation voltage not caused by an increase in electric current supplied to said field coil and caused by an increase in said rotation speed.

23. The system according to claim 22, wherein said generation voltage of said alternator comprises an output voltage of said alternator.

24. The system according to claim 22, wherein said rotor comprises said field coil and a permanent magnet disposed in a magnetic field generated by said field coil.

25. The system according to claim 22, wherein said correction unit comprises a reference-voltage changing unit for changing a voltage of said reference level as the rotation speed of said alternator changes.

26. The system according to claim 25, wherein said reference-voltage changing unit increases said voltage of said reference level as the rotation speed of said alternator becomes higher.

27. The system according to claim 26, wherein the voltage of said reference level is proportional to and higher than the generation voltage of said alternator generated when a field current is not supplied to said field coil.

28. The system according to claim 26, wherein the voltage of said reference level is set lower than a battery voltage.

29. The system according to claim 26, further comprising a unit for nullifying said generation-stop condition signal when the generation voltage of said alternator becomes higher than a battery voltage.

30. The system according to claim 22, wherein said correction unit comprises a maintenance unit for providing a maintenance signal to maintain said generation-stop condition signal after the rotation speed of said alternator becomes higher than a predetermined speed.

31. The system according to claim 30, wherein said maintenance unit provides a warning signal if said condition detection unit provides said generation-stop condition signal when the rotation speed of said alternator is lower than said predetermined speed.

32. The system according to claim 30, wherein said correction unit comprises a reference voltage changing unit for changing the voltage of said reference level as the rotation speed of said alternator changes.

33. The system according to claim 32, wherein said reference voltage changing unit increases said voltage of said reference signal as the rotation speed of said alternator becomes higher.

34. The system according to claim 33, wherein the voltage of said reference level is proportional to and higher than the generation voltage of said alternator generated when a field current is not supplied to said field coil.

35. A system for detecting when an alternator stops generating, said alternator having a rotor including a field coil and a permanent magnet, said system comprising:

a generation condition detection unit providing a generation-stop condition signal when an output voltage of said alternator becomes lower than a reference voltage level;

a speed detection unit detecting a rotation speed of said alternator; and a correction unit for changing said reference voltage level according to said rotation speed so that said reference voltage level is always lower than said output voltage while said alternator is in a normal condition and so that said reference voltage level is always higher than said output voltage when said field coil is not excited.

36. The system according to claim 35, wherein said rotor comprises said field coil and a permanent magnet disposed in a magnetic field generated by said field coil.

37. The system according to claim 35, wherein said correction unit comprises a reference-voltage changing unit for changing said reference voltage level as the rotation speed of said alternator changes.

38. The system according to claim 37, wherein said reference-voltage changing unit increases said reference voltage level as the rotation speed of said alternator becomes higher.

39. The system according to claim 38, wherein said reference voltage level is proportional to and higher than the output voltage of said alternator generated when a field current is not supplied to said field coil.

40. The system according to claim 38, wherein said reference voltage level is set lower than a battery voltage.

41. The system according to claim 38, further comprising a unit for nullifying said generation-stop condition signal when the output voltage of said alternator becomes higher than a battery voltage.

42. The system according to claim 35, wherein said correction unit comprises a maintenance unit for providing a maintenance signal to maintain said generation-stop condition signal after the rotation speed of said alternator becomes higher than a predetermined speed.

43. The system according to claim 42, wherein said maintenance unit provides a warning signal if said condition detection unit provides said generation-stop condition signal when the rotation speed of said alternator is lower than said predetermined speed.

44. The system according to claim 42, wherein said correction unit comprises a reference voltage changing unit for changing said reference voltage level as the rotation speed of said alternator changes.

45. The system according to claim 44, wherein said reference voltage changing unit increases said reference voltage level as the rotation speed of said alternator becomes higher.

46. The system according to claim 45, wherein said reference voltage level is proportional to and higher than the output voltage of said alternator generated when a field current is not supplied to said field coil.

47. A system for detecting when an alternator stops generating, said alternator comprising a stator including a stator winding and a rotor including a field coil and a permanent magnet, said system comprising:

means for providing a generation-stop signal when an output voltage of said stator winding becomes lower than a reference voltage level;

means for detecting a rotation speed of said alternator; and means for changing said reference voltage level according to said rotation speed so that said reference voltage level is always lower than said output voltage when said alternator is in a normal condition and so that said reference voltage level is always higher than said output voltage generated when said field coil is not excited.

48. The system according to claim 47, wherein said rotor comprises said field coil and a permanent magnet disposed in a magnetic field generated by said field coil.

49. The system according to claim 47, wherein said changing means comprises a reference-voltage changing unit for changing said reference voltage level as the rotation speed of said alternator changes.

50. The system according to claim 49, wherein said reference-voltage changing unit increases said reference voltage level as the rotation speed of said alternator becomes higher.

51. The system according to claim 50, wherein said reference voltage level is proportional to and higher than the output voltage of said alternator generated when a field current is not supplied to said field coil.

52. The system according to claim 50, wherein said reference voltage level is set lower than a battery voltage.

53. The system according to claim 50, further comprising a unit for nullifying said generation-stop condition signal when the output voltage of said alternator becomes higher than a battery voltage.

54. The system according to claim 47, wherein said changing means comprises a maintenance unit for providing a maintenance signal to maintain said generation-stop condition signal after the rotation speed of said alternator becomes higher than a predetermined speed.

55. The system according to claim 54, wherein said maintenance unit provides a warning signal if said providing means provides said generation-stop condition signal when the rotation speed of said alternator is lower than said predetermined speed.

56. The system according to claim 54, wherein said changing means comprises a reference voltage changing unit for changing said reference voltage level as the rotation speed of said alternator changes.

57. The system according to claim 56, wherein said reference voltage changing unit increases said reference voltage level as the rotation speed of said alternator becomes higher.

58. The system according to claim 57, wherein said reference voltage level is proportional to and higher than the output voltage of said alternator generated when a field current is not supplied to said field coil.

59. The system according to claim 47, further comprising means for thereafter maintaining said generation-stop signal when said output voltage of said alternator becomes higher than said reference voltage level.

60. A system for detecting when an alternator stops generating, said alternator comprising a stator including an output winding and a rotor including a field coil and a permanent magnet, said system comprising:

first means for providing a reference voltage level which is lower than a normal output voltage of said output winding and higher than an output of said output winding generated when said field coil is not energized in a predetermined speed range;

second means for providing a generation-stop signal when the output voltage of said alternator becomes lower than said reference voltage level; and third means for thereafter maintaining said generation-stop signal when said output voltage of said alternator becomes higher than said reference voltage.

61. The system according to claim 60, wherein said rotor comprises said field coil and said permanent magnet disposed in a magnetic field generated by said field coil.

62. The system according to claim 60, wherein said third means comprises a reference-voltage changing unit for changing said reference voltage level as the rotation speed of said alternator changes.

63. The system according to claim 62, wherein said reference-voltage changing unit increases said reference voltage level as the rotation speed of said alternator becomes higher.

64. The system according to claim 63, wherein said reference voltage level is proportional to and higher than the output voltage of said alternator generated when a field current is not supplied to said field coil.

65. The system according to claim 63, wherein said reference voltage level is set lower than a battery voltage.

66. The system according to claim 63, further comprising a unit for nullifying said generation-stop condition signal when the output voltage of said alternator becomes higher than a battery voltage.

67. The system according to claim 63, wherein said third means comprises a maintenance unit for providing a maintenance signal to maintain said generation-stop condition signal after the rotation speed of said alternator becomes higher than a predetermined speed.

68. The system according to claim 67, wherein said maintenance unit provides a warning signal if said second means provides said generation-stop condition signal when the rotation speed of said alternator is lower than said predetermined speed.

69. The system according to claim 67, wherein said third means comprises a reference voltage changing unit for changing said reference voltage level as the rotation speed of said alternator changes.

70. The system according to claim 69, wherein said reference voltage changing unit increases said reference voltage signal as the rotation speed of said alternator becomes higher.

71. The system according to claim 70, wherein said reference voltage level is proportional to and higher than the output voltage of said alternator generated when a field current is not supplied to said field coil.

* * * * *